April 17, 1962  R. D. CUMMINS  3,030,069

HIGH PRESSURE BUTTERFLY VALVE

Filed Feb. 3, 1961

INVENTOR.
Richard D. Cummins
BY
Popp and Sommer
ATTORNEYS

United States Patent Office 3,030,069
Patented Apr. 17, 1962

3,030,069
HIGH PRESSURE BUTTERFLY VALVE
Richard D. Cummins, Tonawanda, N.Y., assignor to The Firewel Company, Inc., Buffalo, N.Y., a corporation of Ohio
Filed Feb. 3, 1961, Ser. No. 86,937
11 Claims. (Cl. 251—306)

This invention relates to a butterfly valve designed for use in conjunction with high pressure fluids.

In present butterfly valves, the seals along the outboard edges of the wings have a sliding fit with the valve body. This sliding fit provides objectionable friction to movement of the wings particularly during the initial opening or final closing movement of the valve when there is a high pressure drop across the valve.

The principal object of the present invention is to provide such a butterfly valve which is reliably sealed against the passage of the fluids under high pressure when closed and in which there is complete seal disengagement, and a great reduction in opening friction as soon as the valve starts to open.

Another object of the invention is to provide such a butterfly valve which is of sturdy construction so as to withstand a high pressure differential on opposite sides thereof.

Another object is to provide such a butterfly valve which is accurately balanced so as not to be influenced by the flow of fluid therethrough and at the same time provide a very large opening when fully opened.

Another object is to provide such a butterfly valve which is of simple and inexpensive construction and will stand up under conditions of severe and constant use and under a wide range of temperatures and pressures without getting out of order or requiring repairs.

Other objects and advantages of the invention will be apparent from the following description and accompanying drawings in which.

Figure 1:
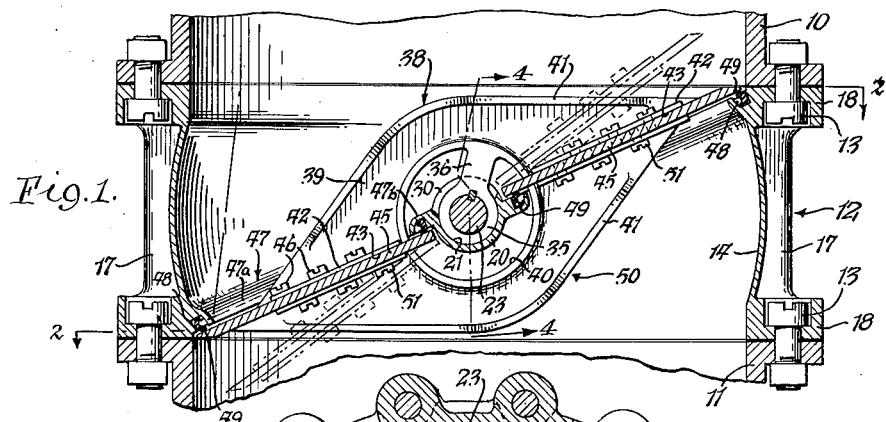
FIG. 1 is a central section through a line in which the butterfly valve of the present invention is installed, the valve also being shown in section.
Figure 2:
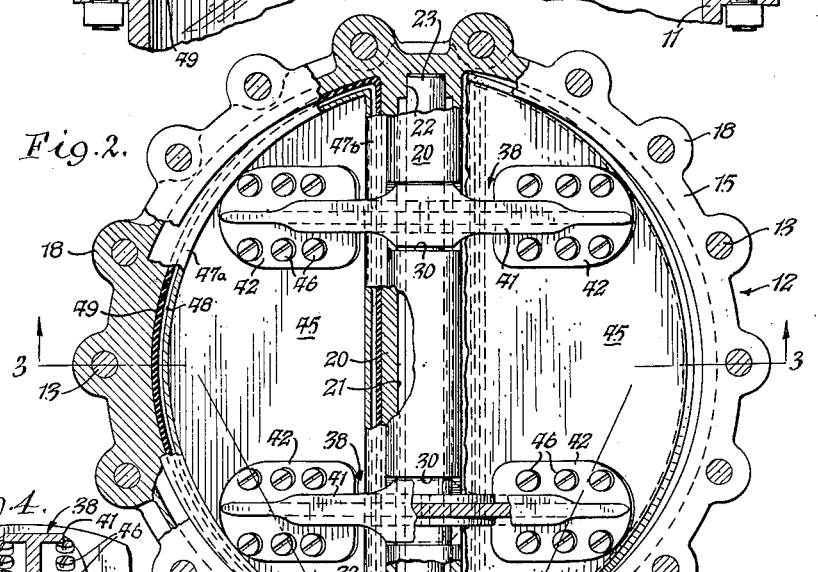
FIG. 2 is a fragmentary face view, partly in section, taken generally on line 2—2, FIG. 1.
Figure 4:
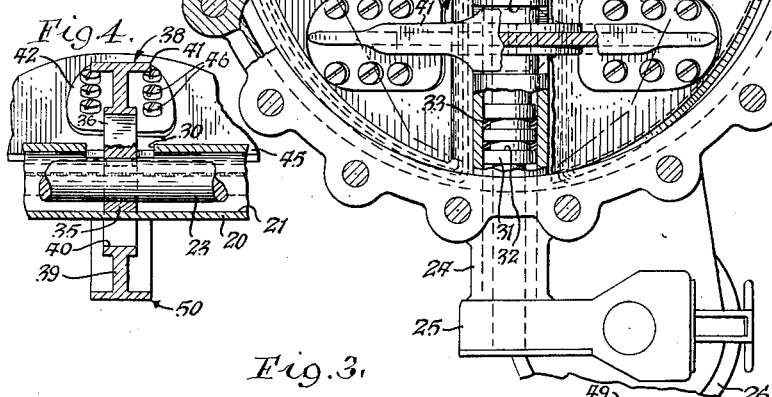
FIG. 4 is a fragmentary section taken generally on line 4—4, FIG. 1.

The valve of the present invention is shown as interposed between the flanged ends of two pipes 10 and 11 and for this purpose is shown as having its body, in the form of a tubular casing indicated generally at 12, secured thereto by means of bolts 13. This body or tubular casing is shown as having an inside spherical surface 14 generated about a point at the center of the body and having axially extending thickened rims 15 and 16. The tubular casing is shown as reinforced by axially extending ribs 17 and at intervals the thickened rims 15, 16 are formed to provide ears 18 through which the bolts 13 extend.

A feature of the invention resides in the provision of an internal tubular bridge piece 20 extending diametrically across the center of the body 12 with its axis coincident with the point about which the spherical surface 14 of the body is generated. This tubular bridge piece 20 can be integral with the shell of the body 12 as shown or can be welded or otherwise secured thereto, it being essential that there be no leakage of fluid between one end of the tubular bridge piece 20 and the shell of the body 12.

One end of the bore 21 of the tubular bridge piece 20 is blind and forms an end bearing 22 for an operating shaft 23. The other end of this bore 21 extends through an integral neck 24 on the exterior of the tubular casing 12 and an actuator (not shown) is fixed to the end of the shaft 23 which projects outwardly from the end of this neck 24. This actuator is contained in a housing 25 and can be moved to oscillate the shaft 23 in any suitable manner as by a piston contained in a cylinder 26.

At axially spaced intervals the tubular bridge piece 20 has one of its sides removed to provide circumferentially extending apertures 30 each of which represents the removal of a semicylindrical segment from the side of the tube. To prevent leakage to or from the interior of the valve via these apertures 30 and the open end of the bore 21, at the open end of the bore 21 the shaft 23 is provided with a cylindrical enlargement 31 fitting in the bore 21 and containing annular grooves 32 in each of which an O-ring 33 of yielding material is compressed to provide a reliable seal between the enlargement 31 and the bore 21.

Within each of the apertures 30 is keyed or otherwise fixed the hub 35 of an arm 36 which projects radially outwardly from the shaft 23 and is capable of swinging with the shaft as permitted by the slot 30. Formed integrally with the outer end of each arm 36 is a beam 38 which is of arching form, having a central web 39 with an arcuate internally flanged opening 40, an outer marginal flange 41 and pair of attaching plates 42, these attaching plates 42 being in line with each other and having external faces 43 which lie in a plane substantially coincident with the axis of the shaft 23.

Figure 3:
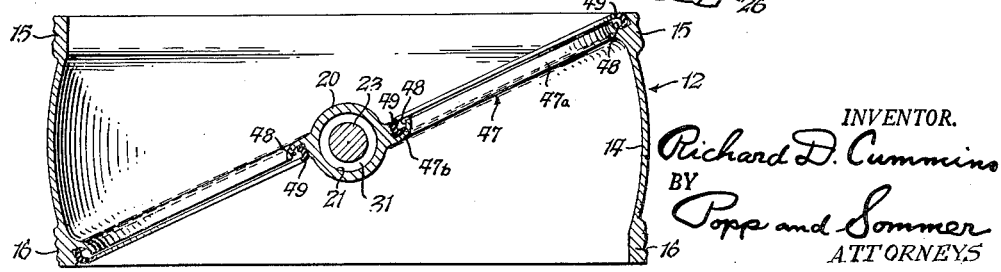
FIG. 3 is a fragmentary section taken generally on line 3—3, FIG. 2.

To these plates are secured the wings 45 of the butterfly valve, as by screws 46. These wings are in the form of metal plates of semicircular or half-moon shape form and each of which closes against an endless D-shaped rib or shoulder 47 formed on the tube 20 and the interior of the seal of the casing 12. Thus, each of these ribs or shoulders 47 includes a semicircular C-shaped portion 47a formed integrally with the shell of the valve body or casing 12 and extending inwardly from the semicylindrical bore 14 thereof along a plane which intersects the axis of the shaft 23 and which also preferably intersects the opposite rims 15 and 16 of the tubular casing 12 as best shown in FIGS. 1 and 3. The ends of the C-shaped portion 47a of each rib or shoulder 47 are connected by a straight rib or shoulder 47b formed integrally with the corresponding side of the tube 20. Each rib or shoulder 47 is provided with an endless D-shaped channel 48 extending therearound, the channel 48 of one rib or shoulder 47 facing in one direction and the channel 47 of the other rib or shoulder facing in the opposite direction. Each of these channels 48 contains an endless seal 49 made of rubber or similar flexible resilient plastic which is D-shaped in outline to fit in the channel 48 and which is preferably C-shaped in cross section with its channel opening inwardly or toward the center of the seal. Each of the seals 49 projects outwardly from its channel 48 and engages the face of a corresponding D-shaped wing 45 around the margin thereof.

Counterbalancing beams indicated generally at 50 are secured, as by screws 51, to the sides of the wings 45 opposite from the beams 38. The purpose of these counterbalancing beams 50 is merely to counterbalance the weight of the beams 35 and for this purpose they can be of any suitable form but are shown as being generally of the same form as the beams 38.

In the operation of the valve the actuator (not shown) in the housing 25 is turned, as by the piston in the cylinder 26, to turn the shaft 23 to, say, open the butterfly valve. Turning the shaft 23 effects a corresponding rotation of the hubs 35 and arms 36 which project outwardly from the circumferentially extending apertures 30 in one side of the tubular bridge piece 20, movement of these arms being permitted by these apertures. This effects corresponding movement of the beams 38 and since the wings 45 are secured to the opposite ends of these beams 38 by the screws 46, this swings these wings 45 away from the D-shaped ribs or shoulders 47 and out of contact with the seals 49 therein which are also of D-shaped outline. Accordingly the wings 45 are brought to the dotted line position shown in FIG. 1 and fluid is permitted to flow from one pipe 10 through the valve to the other pipe 11, this fluid flowing through the two openings outlined by the D-shaped ribs or shoulders 47. In this flow the pressure against one wing 45 balances the pressure against the other wing 45 as is the usual manner with butterfly valves. It will particularly be noticed that as soon as the seals 49 leave contact with the ribs or shoulders 47 the frictional resistance to valve opening is greatly reduced since especially at this period of high pressure drop across the valve the only friction against continued opening is the friction of the shaft 23.

When it is desired to close the valve the shaft 23 is turned in the opposite direction to swing the pair of arms 36 and their integral beams 38 toward the full line position shown in FIG. 1. In such closing movement each wing 45 contacts and compresses its rubber seal 49 which is D-shaped in outline and hence provides a seal completely around the rim of the wing 45. Since these sealing rings 49 are C-shaped in cross section with their channels opening inwardly or toward the center of the seal, the seal on the pressure side of the valve wing 45 will have its edges forced outwardly or away from each other by the pressure of the fluid so that increased pressure insures a tighter seal. The valve therefore is adapted to high pressure.

It will particularly be noted that for high pressure work each wing 45 seats against a continuous or endless D-shaped shoulder 47 having a continuous or endless D-shaped groove 48 containing a continuous or endless D-shaped seal 49 so that the margin or rim of each wing 45 is positively sealed around its entire extent and abuts against a continuous shoulder. It will further be noted that the O-ring seals 33 at one end of the shaft 23 provide adequate seal against leakage of fluids under high pressure from the open end of the bore 21 surrounding the operating end of the shaft 23. It will further be noted that the valve is fully counterbalanced and of very simple and sturdy construction.

It will be apparent that obvious changes can be made without departing from the spirit of the invention, such as the use of anti-friction bearings for the valve shaft and mounting the D-shaped seals 49 on the wings instead of on the valve body.

What is claimed is:

1. A butterfly valve, comprising a tubular casing having an inlet opening at one end and an outlet opening at its other end, an internal bridge piece fixed at its opposite ends to and extending diametrically across the interior of said casing, an endless shoulder facing said inlet extending along said bridge piece and around one side of the interior of said casing, an endless shoulder facing said outlet extending along said bridge piece and around the other side of the interior of said casing, a shaft extending diametrically across the interior of said casing within said bridge piece, a pair of wings each adapted to have a face at its margin brought against the corresponding shoulder the full length of the latter, and arms fixing said wings to said shaft to rotate therewith.

2. A butterfly valve as set forth in claim 1 wherein endless seals conforming to the outline of said shoulders are operatively interposed between each of said shoulders and the opposing face of the corresponding wing.

3. A butterfly valve as set forth in claim 2 wherein each of said resilient seals is C-shaped in cross section with its channel facing toward the center of the seal.

4. A butterfly valve as set forth in claim 1 wherein said first mentioned shoulder is provided with a conforming endless groove opposing said outlet, said second mentioned shoulder is provided with a conforming endless groove opposing said inlet, and a continuous resilient seal which conforms with and is arranged partly in each of said grooves to be engaged by said face of the corresponding wing near the margin thereof.

5. A butterfly valve, comprising a tubular casing having an inlet opening at one end and an outlet opening at its other end, an internal tube fixed at its opposite ends to and extending diametrically across the interior of said casing, an endless shoulder facing said inlet extending along said tube and around one side of the interior of the casing, an endless shoulder facing said outlet extending along said tube and around the other side of the interior of said casing, a shaft journalled in said tube and having one end projecting exteriorly of said casing, said tube being provided with at least one circumferentially extending aperture in one side, a pair of wings each adapted to have a face at its margin brought against the corresponding shoulder, an arm fixed to said shaft and projecting outwardly through said aperture, and means connecting the outboard end of said arm with each of said wings.

6. A butterfly valve as set forth in claim 5 wherein an annular sealing ring of soft resilient plastic material is interposed between said tube and said one end of said shaft.

7. A butterfly valve as set forth in claim 5 wherein said last means comprises a beam fixed to and connecting said wings and connected at its center to said arm.

8. A butterfly valve as set forth in claim 7 wherein endless seals conforming to the outline of said shoulders are operatively interposed between each of said shoulders and the opposing face of the corresponding wing.

9. A butterfly valve as set forth in claim 8 wherein each of said resilient seals is C-shaped in cross section with its channel facing toward the center of said seal.

10. A butterfly valve as set forth in claim 7 wherein said first mentioned shoulder is provided with a conforming endless groove opposing said inlet, said second mentioned shoulder is provided with a conforming groove opposing said outlet, and a continuous resilient seal which conforms with and is arranged partly in each of said grooves to be engaged by said face of the corresponding wing near the margin thereof.

11. A butterfly valve as set forth in claim 7 wherein an endless resilient seal which conforms with and is carried by each of said shoulders in position to be engaged by said face of the corresponding wing near the margin thereof.

References Cited in the file of this patent
UNITED STATES PATENTS

| | | |
|---|---|---|
| 2,815,924 | Burch | Dec. 10, 1957 |
| 2,946,554 | Asker | July 26, 1960 |
| 2,986,373 | Masheder | May 30, 1961 |
| 2,988,320 | Kent | June 13, 1961 |